United States Patent

Bonjyo et al.

[15] 3,690,589

[45] Sept. 12, 1972

[54] TAPE END DETECTION DEVICE FOR TAPE RECORDER

[72] Inventors: Takuro Bonjyo; Katsuyuki Yamashita, both of Yokohama, Japan

[73] Assignee: Victor Company of Japan Limited, Yokohama, Japan

[22] Filed: Feb. 13, 1970

[21] Appl. No.: 11,166

[30] Foreign Application Priority Data

Feb. 18, 1969 Japan ......................44/11511

[52] U.S. Cl. .......................242/191, 200/24, 242/57, 310/236

[51] Int. Cl. .........................B65h 25/32, G11b 15/46

[58] Field of Search.......242/57, 58.3, 186, 191, 197, 242/199; 242/200; 200/11 A, 24; 310/236, 233, 232, 216

[56] References Cited

UNITED STATES PATENTS

| | | | |
|---|---|---|---|
| 3,488,017 | 1/1970 | Schatteman | 242/191 |
| 2,277,899 | 3/1942 | Aufiero | 200/24 |
| 2,963,235 | 12/1960 | Pedersen et al. | 242/58.3 |
| 3,498,568 | 3/1970 | Blaschke | 242/57 X |
| 3,511,451 | 5/1970 | Emmert | 242/57 X |
| 3,036,165 | 5/1962 | Kalin et al | 310/236 X |

*Primary Examiner*—Werner H. Schroeder
*Attorney*—Holman & Stern

[57] ABSTRACT

A tape end detection device for a tape recorder comprising a substantial switch means to open or close alternately in cooperation with a rotary body during running of a tape, a capacitor charging and discharging through the switch means, and a detection output means actuating when after the tape stops its running and the switch means stops its opening or closing, the capacitor discharges a predetermined amount.

3 Claims, 4 Drawing Figures

INVENTORS
T. BOJYO
K. YAMASHITA

BY Holman, Glascock, Downing & Seebold
ATTORNEYS

INVENTORS
T. BOJYO
K. YAMASHITA

BY Holman, Glascock, Downing & Seebold
ATTORNEYS

TAPE END DETECTION DEVICE FOR TAPE RECORDER

BACKGROUND OF THE INVENTION

This invention relates to a tape end detection device for a tape recorder, and more particularly to a device for automatically detecting the end of a running tape which has been unwound from a tape reel.

The tape end detection devices of conventional type have included one which may detect the termination of unwinding of a tape from a supply reel by detecting a sensing tape adhered adjacent to the end of the tape with a sensor. There has been another conventional detection device which may detect the termination of unwinding of a tape by reproducing detection signals previously recorded on an edge of the tape.

Such conventional detection devices specifically need the use of a special tape prearrangedly adhered with a sensing tape or having a detection signal recorded thereon. Otherwise, it is almost impossible for preferred tapes to be detected of their ends. Further, when troubles should occur in the course of running such as cutoff in the tape, the end of the cutoff tape can not readily be detected by the sensor. The latter device which cooperates with the detection signals has another disadvantage in that when the tape is rapidly supplied or it is rewound at a speed greater than the speed of ordinary recording and reproducing, a detection signal is reproduced at a frequency different from that produced in the ordinary running so that the detection of termination of the tape is not feasible.

The general object of the present invention is to remove the above described disadvantages.

SUMMARY OF THE INVENTION

A primary object of the present invention is to provide a novel tape end detection device which can securely and accurately detect on a preferred tape the termination of running of a tape after being unwound from a tape reel of a tape recorder, wherein a preferred tape can be used without the adhered sensing tape or the recorded detection signals.

Another object of the invention is to provide a tape end detection device which is capable of detecting the end of a tape irrespective of the tape speed or the end of a tape accidentally cutoff in the course of its running.

A further object of the invention is to provide a tape end detection device which has a switching circuit utilizing the rotation of the tape reel unwinding a tape and is adapted to operate the tape recorder automatically either in the stopping or rewinding modes of operation at the instant when the rotation of the tape reel has been stopped.

BRIEF DESCRIPTION OF THE DRAWINGS

Other objects and features of the invention will become apparent from the progress of the following description when read with reference to the accompanying drawings, in which.

DETAILED DESCRIPTION OF THE INVENTION

Figure 1:
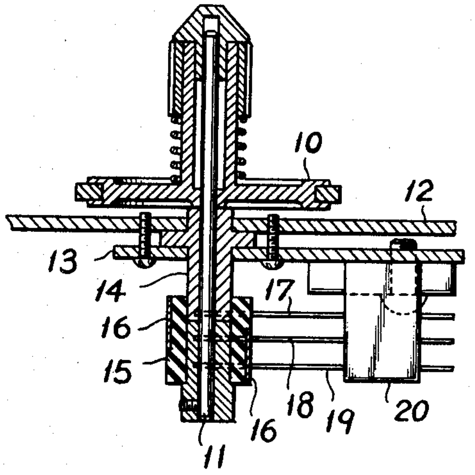
FIG. 1 is a vertical sectional view of an embodiment of a tape reel rotation detecting part according to the invention.
Figure 2:
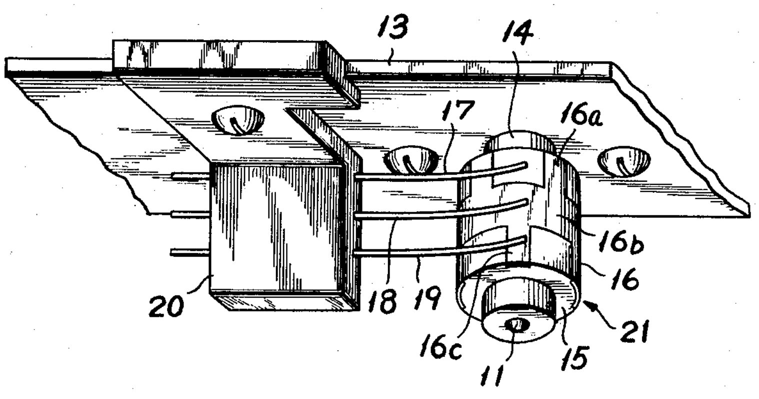
FIG. 2 is a perspective view of the tape reel rotation detecting part as seen from the lower side.

FIGS. 1 and 2 show an embodiment of the tape reel rotation detecting part in use for the device of the present invention. A reel shaft 11 rotatable together with a reel disk 10 is rotatably carried by a sleeve bearing 14 rigidly held between a chassis base 12 and a subchassis base 13. At the lower end of the shaft 11 is secured a cylinder 15 of an electrically insulating material. The peripheral surface of the cylinder 15 is provided with a conductor 16 consisting of a conductive material having a middle annular portion **16*b* and protrusions 16*a* and 16*c* respectively are provided laterally on each side of the middle annular portion and are in the same peripheral plane, with all these forming components a commutator 21. The protrusions 16*a* and 16*c* of the conductor 16** are in alternate arrangement with each other in the transverse direction. Widths of the protrusions are respectively smaller than the spaces between the protrusions.

Three brushes 17, 18 and 19 are vertically held in succesive arrangement by means of a brush holder 20 secured at the lower surface of the subchassis base 13. The brushes 17, 18 and 19 are respectively electrically connected as later described and their tips are capable of being in contact with the protrusion **16*a*, the annular portion 16*b* and the protrusion 16*c***, respectively.

Figure 3:
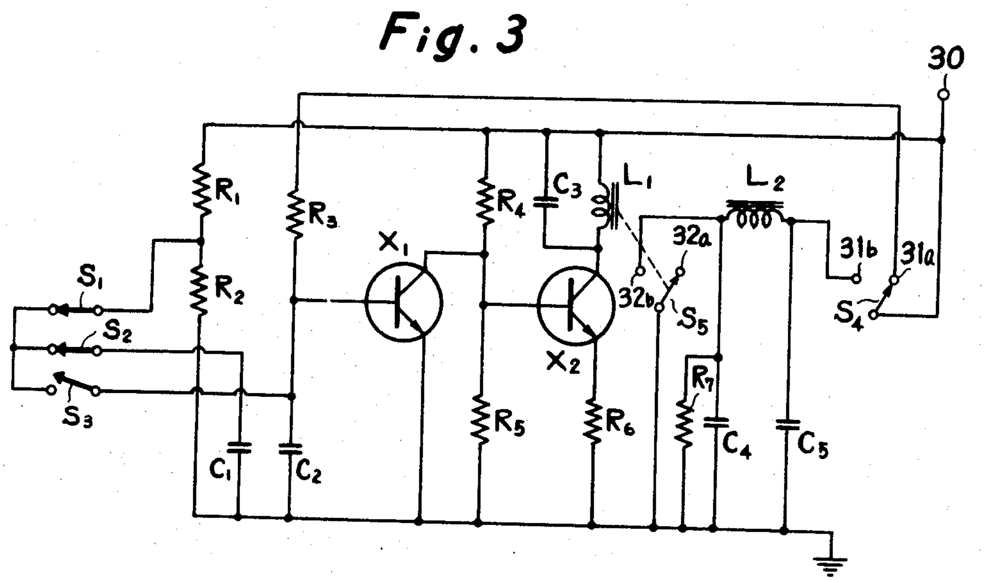
FIG. 3 is an electrical circuit diagram of an embodiment of the device according to the invention.

FIG. 3 illustrates an embodiment of an electrical circuit included in the device of the present invention. Switches $S_1$, $S_2$ and $S_3$ are formed with the brushes 17, 18 and 19. By rotation of the commutator 21, the brushes 17 and 19 alternately contact with the protrusions **16*a*, 16*c* and the insulating cylinder 15 respectively, causing the switches $S_1$ and $S_3$ alternately to open or close. The brush 18 contacts the annular portion 16*b* at all times during rotation of the commutator 21 so that the switch $S_2$ is always closed. With the described configuration of the protrusions 16*a* and 16*c*, the brushes 17 and 19 will not simultaneously contact the protrusions 16*a* and 16*c***. Therefore, the switches $S_1$ and $S_3$ will not simultaneously close but alternately open or close with a short interval of simultaneous opening. The switch $S_1$ is connected to a junction point of resistors $R_1$ and $R_2$, the switch $S_2$ to a positive side of a capacitor $C_1$ and the switch $S_3$ to a positive side of a capacitor $C_2$, respectively.

A resistor $R_3$ is connected to a contact **31*a* of a switch $S_4$ which is connected to a power source terminal 30. Base of a transistor $X_1$ is connected to a junction point of the resistor $R_3$ and the capacitor $C_2$. Base of a transistor $X_2$ is connected to a collector of the transistor $X_1$ and further connected to the power source terminal 30 through a resistor $R_4$. There is provided a relay $L_1$ between the collector of the transistor $X_2$ and the power source terminal 30. On operating, the relay $L_1$ changes over a switch $S_5$ from a contact 32*a* to a contact 32*b*. A plunger $L_2$ is provided in connection between contacts 31*b* and 32*b*** of the switches $S_4$ and $S_5$ so as to change the operating mode of the tape recorder when it is actuated.

Figure 4:
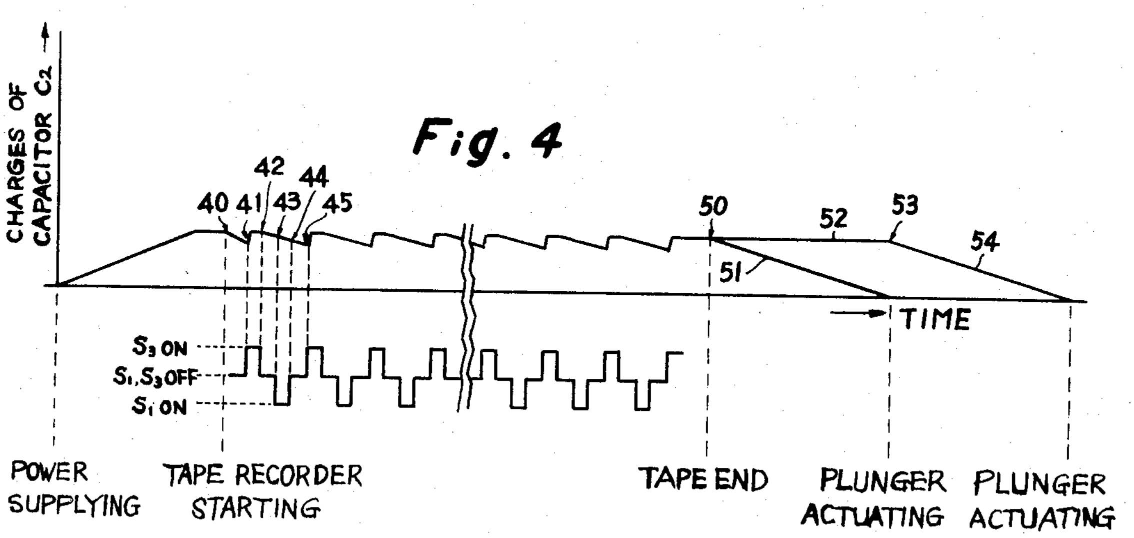
FIG. 4 is a time chart illustrating an operation of the device of the present invention.

Operation of the described circuit is now illustrated with reference to the time chart of FIG. 4. Before starting of operation of the tape recorder, the power source terminal 30 is connected to the power source. At the instant the switch $S_4$ is connected to the contact 31*a*, the capacitor $C_2$ is charged approximately in three seconds through the switch $S_4$ and the resistor $R_3$. When the terminal voltage of the capacitor $C_2$ rises higher than the voltage $V_{BE}$ between the base of the transistor $X_1$ and the emitter of the transistor $X_1$, the transistor $X_1$ is in a conductive state. By conductance of the transistor $X_1$, the voltage drop of the resistor $R_4$ or the voltage $V_{CE}$ between the collector and the emitter of the transistor $X_1$ falls below the voltage $V_{BE}$ between the base and the emitter of the transistor $X_2$ so that the transistor $X_2$ becomes nonconductive.

In the operation of the tape recorder, the play mode button of the tape recorder may be pushed and the switch $S_4$ associated with the button may be changed over to make a connection with the contact 31*b*. At the instant, the transistor $X_2$ is in non-conductive state, the relay $L_1$ is not in operation and the switch $S_5$ is connected to the contact 32*a*. Therefore, the plunger $L_2$ will not actuate even though the switch $S_4$ is connected to the contact 31*b*.

The capacitor $C_2$ is then cutoff the supply of a voltage through the resistor $R_3$ by the change-over of the switch $S_4$ and starts its discharging through the base and the emitter of the transistor $X_1$. The starting point of discharging is shown by a numeral 40 in FIG. 4. When the tape recorder starts operation and the tape runs, the reel shaft 11 rotates together with the supply reel to unwind the tape resulting in the rotation of the commutator 21. By rotation of the commutator 21, the switch $S_1$ will repeat the opening and closing operations intermittently. The capacitor $C_1$ is charged by a voltage divided by the resistors $R_1$ and $R_2$ at the instant the switch $S_1$ is ON (closed).

After the switch $S_3$ is turned ON after the switch $S_1$ being turned OFF, the electric charge in the capacitor $C_1$ flows to the capacitor $C_2$ through the switch $S_3$ and the the capacitor $C_1$ is charged. The starting point of the charging is shown by a numeral 41 on the time chart in FIG. 4. When the switch $S_3$ becomes OFF, the capacitor $C_2$ starts discharging again from a point 42 on the same figure and continues its discharging during the charging period (between points 43 and 44) of the capacitor $C_1$ after the switch $S_1$ being turned ON. The discharging of the capacitor $C_2$ continues until its discharging point reaches a point 45 (corresponding to the above described point 41) where the switch $S_3$ is again ON after the switch $S_1$ is turned OFF. The capacitor $C_2$ will reach the point 45 and is charged by the capacitor $C_1$ before its discharging is completed. Thus, the terminal voltage of the capacitor $C_2$ is constantly held larger than the base-emitter voltage $V_{BE}$ of the transistor $X_1$ and therefore the transistor $X_1$ is held in a conductive state and the transistor $X_2$ is non-conductive. Subsequently, in the same manner, the capacitor $C_2$ continues to charge and discharge by the capacitor $C_1$ in repetition of the points 41–45.

During the rotation of the commutator 21, the transistor $X_1$ is held in a conductive state and the transistor $X_2$ in non-conductive state, and accordingly the relay $L_1$ and the plunger $L_2$ respectively are held non-operative.

At the instant when the tape is completely delivered off the supply reel, the reel stops its rotation since the tape end is fixed at the reel hub. As the reel stops its rotation, the reel shaft 11 and also the commutator 21 stop their rotations. The switches $S_1$–$S_3$ being equivalently and substantially formed of the conductor 16 and the brushes 17 – 19 stop their opening and closing operations.

An instance where the commutator 21 ceases its rotation having the switch $S_3$ being OFF is now illustrated. As the capacitor $C_2$ is interrupted from the capacitor $C_1$ by the switch $S_3$ being OFF, the capacitor $C_2$ discharges along an inclination line 51 from a point 50 in FIG. 4. By discharging of the capacitor $C_2$ the base potential of the transistor $X_1$ will fall, and after discharging of an amount as predetermined by the capacitor $C_2$, the transistor $X_1$ turns non-conductive, so that the voltage drop of the resistor $R_4$ will not occur and the collector-emitter voltage $C_{CE}$ of the transistor $X_1$ becomes larger than the base-emitter voltage $V_{BE}$. The base potential of the transistor $X_2$ rises and the transistor $X_2$ becomes to be in a conductive state.

Further, when the switch $S_3$ is stopped in the OFF state, the switch $S_1$ will stop in the state of ON or OFF. Even though the switch $S_1$ is ON, during discharging of the capacitor $C_2$, the capacitor $C_1$ is charged through the switch $S_1$.

As hereinbefore described, if the transistor $X_2$ becomes to be in a conductive state, the relay $L_1$ will actuate. By action of the relay $L_1$, the switch $S_5$ is changed in connection from the contact 32*a* to the contact 32*b*. The plunger $L_2$ through the switch $S_4$ as previously connected to the contact 31*b* is closed in circuit to the source and it is actuated. The plunger $L_2$ is in connection to the mechanism of the tape recorder so as to operate the tape recorder in a tape stopping mode or a tape rewinding mode and automatically change over the tape recorder from an ordinary recording and reproducing mode to a stopping or rewinding mode.

The switch $S_4$, when the described mode changing mechanism of the tape recorder actuates, mechanically associates with the mechanism and is changed to the contact 31*a* from the 31*b* so as to open the circuit to the plunger $L_2$. Thereby the plunger $L_2$ is avoided from a continuous flow of current therein. The capacitor $C_2$ is closed in circuit for subsequent operation and is charged again.

In case the switch $S_3$ is ON and the commutator 21 stops its rotation, the switch $S_1$ stays in the OFF condition. Therefore, the capacitor $C_2$ discharges and is then charged from the capacitor $C_1$ through the switch $S_3$ so that the charged amount of the capacitor $C_2$ remains along a line 52 for a certain period of time from the point 50 in FIG. 4 and thereafter the charges decrease along a line 54 from a point 53. When the discharging of the electric charges charged in the capacitors $C_1$ and $C_2$ nearly come to an end and the terminal voltage of the capacitor $C_2$ falls below the base-emitter voltage $V_{BE}$ of the transistor $X_1$, the transistor $X_1$ turns non-conductive and the transistor $X_2$ conductive. As the transistor $X_2$ is in a conductive state, the relay $L_1$ actuates in the same manner as described above and the plunger $L_2$ actuates.

If the rotation of the reel stops as well as the rotation of the commutator 21, the plunger $L_2$ securely actuates whatever are the states of the opening or closing of the switches $S_1$ and $S_3$ since the switches $S_1$ and $S_3$ will not stop in being simultaneously ON.

It is preferred that the discharging period of the capacitor $C_2$ may be appreciably longer than the opening and closing time of the switches $S_1$ and $S_3$. The diameter of The tape wound on the supply reel is at a maximum at the starting time of tape delivery where the rotation speed of the commutator 21 is slowest and hence the opening or closing time of the switches $S_1$ and $S_3$ are longest. Therefore the discharging period of the capacitor $C_2$ must be determined taking into consideration this longest time. HOwever, it must be determined at a possible minimum time, because if the discharging time of the capacitor $C_2$ is excessively long, the time from stopping of the commutator 21 to operating of the plunger $L_2$ will be longer. If the discharging time of the capacitor $C_1$ is excessively long it will cause a larger time difference (expressed in the interval between the lines 51 and 54 in FIG. 4) in the operation of the plunger $L_2$ depending on the time of stopping of the switch $S_3$ in the OFF position and in the ON position. Therefore the discharging time of the capacitor $C_1$ as described should be preferred also at a minimum. In the embodiment shown, it may be preferably arranged that the time while the plunger $L_2$ starts its action after the switch $S_3$ has been stopped in the OFF state is approximately 4 seconds and the time while the plunger $L_2$ actuates after the switch $S_3$ has been stopped in the ON state is approximately 8 seconds.

In the following is shown an example of respective resistance values of the resistors $R_1$–$R_7$ and respective capacitances values of the capacitors $C_1$–$C_5$ serving as circuit elements for the circuit of FIG. 3.

| | | |
|---|---|---|
| Resistance | $R_1$ | 3.9KΩ |
| | $R_2$ | 470Ω |
| | $R_3$ | 68KΩ |
| | $R_4$ | 8.2KΩ |
| | $R_5$ | 2.2KΩ |
| | $R_6$ | 2.2Ω |
| | $R_7$ | 10KΩ |
| Capacitance | $C_1$ | 47μF |
| | $C_2$ | 47μF |
| | $C_3$ | 100μF |
| | $C_4$ | 0.02μF |
| | $C_5$ | 1000μF |

In the actual circuit a resistor of 10 KΩ in the resistance will be connected to the base of the transistor $X_1$.

There will be obtained a more stable operation by use of a temperature-compensating or operation-compensating element for the resistor $R_2$.

The invention may, without departing from the spirit thereof, be applied in various modifications other then the above described embodiments. As, for instance, the switches $S_1$–$S_3$ may not exclusively have the construction consisting of the commutator 21 and the brushes 17–19, since those may be substituted for by cam switches cooperating with a cam rotatable with the reel shaft 11. Or a construction may be designed such that by the tape end detection the plunger $L_2$ is not actuated but a detection and indication device using such means as a lamp to serve for the same object. And the plunger $L_2$ may be provided to cooperate with other means than the mode changing device. Furthermore, the above described device can be provided not only at the supply reel side but also at the take-up reel side wherein the tape end detection can be applied during the reciprocal movement of the tape.

Even though the tape end is not fixed at the reel, the reel will stop its rotation after all of the tape has been delivered and the detection can be made as desired. Or when the tape is cutoff during the running movement the reel which delivers the tape will stop its rotating so that the same detection can be assured as described above. According to the invention it is likewise possible to make automatically a stopping mode by detection of the tape end even if the the tape recorder is locked in a rewinding or a fast forwarding mode. It is noted that in the casette type tape recorder there is required the above described push button which is to be successively pushed for the rewinding or the fast forwarding mode. According to the present invention, the mode button can be constructed such that it is locked as desired without a need of successively pushing the button.

What we claim is:

1. A tape end detection device for a tape recorder having a shaft and a reel, said device comprising a cylinder of an electrically insulating material secured at one end of the shaft rotatable together with the reel, a conductor having a middle annular portion and first and second protrusions respectively provided laterally on each side of the middle annular portion and being in the same peripheral plane as the middle annular portion, said conductor being provided on the outer peripheral surface of the cylinder, each of said protrusions having a width smaller than the spaces between adjacent protrusions on each side of the middle annular portion, said first and second protrusions on each side of the middle annular portion being in alternate relationship with each other in the transverse direction, three brushes contacting with the middle annular portion and the protrusions respectively, a first brush of said three brushes contacting the first protrusions, a second brush contacting the middle annular portion, and a third brush contacting the second protrusions, a first switch means including the first and the second brushes, the first protrusions and the middle annular portion, a second switch means including the second and third brushes, the second protrusions and the middle annular portion, a power source, a first capacitor connected to the power source through the first switch means, said first capacitor being adapted to be charged intermittently from the power source through the first switch means and to be discharged through the second switch means during rotation of the reel, a second capacitor connected in parallel to the first capacitor through the second switch means, said second capacitor being adapted to be discharged while said first capacitor is intermittently charged through the second switch means, and a detection output means connected to said second capacitor, with said detection output means being adapted to be operated when its terminal voltage falls below a pre-determined voltage by discharging of said second capacitor.

2. The tape end detection device for a tape recorder as defined in claim 1 wherein said detection output means includes a first transistor having a base connected to the second capacitor and to the second switch means and being in a non-conductive state when said second capacitor is discharged through said first transistor and its base voltage falling below a predetermined voltage, a second transistor having a base connected to the output of the first transistor and to the power source through a resistor, and being in a conductive state by the non-conductive state of said first transistor.

3. The tape end detection device for a tape recorder as defined in claim 2 wherein said detection output means further includes a detection output part connected between the output of the second transistor and the power source, said detection output part having a relay actuated by conductance of said second transistor and a plunger for changing the mode of the tape recorder, said plunger being actuated by closing of a circuit to the power source by said relay, and change over switch closed at the starting time of the tape recorder and being changed by action of said detection output to open said detection output part.

* * * * *